(12) United States Patent
Steinberger et al.

(10) Patent No.: US 10,752,145 B2
(45) Date of Patent: Aug. 25, 2020

(54) PNEUMATIC DEVICE

(71) Applicant: Conti Temic Microelectronic GmbH, Nuremberg (DE)

(72) Inventors: Johann Steinberger, Brunnen (DE); Wolfgang Thiel, Denkendorf (DE)

(73) Assignee: Conti Temic Microelectronic GmbH (DE)

( * ) Notice: Subject to any disclaimer, the term of this patent is extended or adjusted under 35 U.S.C. 154(b) by 23 days.

(21) Appl. No.: 16/308,046

(22) PCT Filed: Jul. 11, 2017

(86) PCT No.: PCT/EP2017/067339
§ 371 (c)(1),
(2) Date: Dec. 7, 2018

(87) PCT Pub. No.: WO2018/011175
PCT Pub. Date: Jan. 18, 2018

(65) Prior Publication Data
US 2019/0308537 A1    Oct. 10, 2019

(30) Foreign Application Priority Data

Jul. 11, 2016 (DE) .......................... 10 2016 212 586

(51) Int. Cl.
*A47C 4/54* (2006.01)
*B60N 2/90* (2018.01)
*A61H 9/00* (2006.01)

(52) U.S. Cl.
CPC ........... *B60N 2/914* (2018.02); *A61H 9/0078* (2013.01); *A61H 2201/0149* (2013.01); *B60N 2/976* (2018.02)

(58) Field of Classification Search
CPC ... B60N 2/914; B60N 2/976; B29L 2031/771; A61H 9/0078; A61H 2201/0103;
(Continued)

(56) References Cited

U.S. PATENT DOCUMENTS 4,444,430 A * 4/1984 Yoshida ................. A47C 7/467
297/284.6
5,076,643 A * 12/1991 Colasanti ............... A47C 7/467
297/284.6
(Continued)

FOREIGN PATENT DOCUMENTS

DE      102007051759 A1    5/2009
DE      102014002942 A1    9/2015
WO        2004026623 A1    4/2004

OTHER PUBLICATIONS

International Search Report and Written Opinion for International Application No. PCT/EP2017/067339, dated Oct. 10, 2017—12 pages.

(Continued)

*Primary Examiner* — Chi Q Nguyen
(74) *Attorney, Agent, or Firm* — RatnerPrestia (57) ABSTRACT

A pneumatic device for varying a contour of a seat bearing surface includes a carrier foil TF composed of a first and a second foil ply which are arranged adjacent to one another. The pneumatic device has a first bladder for varying the contour of the seat bearing surface, including a bladder chamber which can be filled with pressure medium (DM). The pneumatic device furthermore has a first pressure medium line connected to the first bladder and which is formed by connection of the first and second foil plies along a line-side connection seam to create a pressure medium connection to the bladder chamber of the first bladder. One foil ply has, in the region of the first bladder, an opening in order to form a pressure medium channel to a further bladder, which can be filled with pressure medium and is connected to one of the foil plies.

19 Claims, 4 Drawing Sheets (58) Field of Classification Search
CPC .... A61H 2201/0149; A61H 2201/5071; A61H 9/005; A61H 9/00
USPC ......... 297/284.6, 284.4, 284.2, 284.3, 284.1, 297/DIG. 3, DIG. 8; 5/713; 383/3
See application file for complete search history.

(56) References Cited

U.S. PATENT DOCUMENTS

| | | | |
|---|---|---|---|
| 5,096,529 A | 3/1992 | Baker et al. | |
| 5,135,282 A * | 8/1992 | Pappers | B60N 2/914 297/284.3 |
| 5,558,398 A * | 9/1996 | Santos | A47C 4/54 297/284.3 |
| 5,713,631 A * | 2/1998 | O'Neill | A47C 4/54 297/284.6 |
| 5,975,629 A | 11/1999 | Lorbiecki | |
| 6,126,152 A * | 10/2000 | Santos | F16F 9/04 267/118 |
| 6,129,419 A * | 10/2000 | Neale | B60N 2/58 297/284.4 |
| 6,203,105 B1 * | 3/2001 | Rhodes, Jr. | A47C 4/54 297/284.6 |
| 6,212,719 B1 * | 4/2001 | Thomas | A47C 4/54 297/284.6 |
| 6,551,450 B1 * | 4/2003 | Thomas | A61H 9/0078 156/580.1 |
| 6,916,300 B2 * | 7/2005 | Hester | A61H 23/04 297/284.6 |
| 7,267,404 B2 * | 9/2007 | Kern | F16K 11/0716 297/284.6 |
| 8,162,398 B2 * | 4/2012 | Colja | A61H 9/0078 297/284.4 |
| 8,678,500 B2 * | 3/2014 | Lem | B60N 2/914 297/284.6 |
| 9,725,177 B2 * | 8/2017 | John | A47C 27/10 |
| 10,214,129 B2 * | 2/2019 | Jaranson | B60N 2/914 |
| 10,363,852 B2 * | 7/2019 | Strumolo | B60N 2/99 |
| 10,406,063 B2 * | 9/2019 | Mitchell | A61H 23/006 |
| 2004/0097854 A1 * | 5/2004 | Hester | A61H 23/04 601/149 |
| 2006/0049678 A1 | 3/2006 | Kern et al. | |
| 2006/0085919 A1 * | 4/2006 | Kramer | A47C 27/082 5/713 |
| 2006/0217644 A1 * | 9/2006 | Ozaki | A61H 9/0078 601/148 |
| 2008/0080793 A1 * | 4/2008 | Kitou | A61H 9/0078 383/3 |
| 2010/0031449 A1 * | 2/2010 | Cheng | A61H 9/0078 5/713 |
| 2011/0203589 A1 * | 8/2011 | Fenton | A61M 16/0072 128/205.13 |
| 2011/0227388 A1 * | 9/2011 | Bocsanyi | B60N 2/914 297/452.41 |
| 2015/0025425 A1 * | 1/2015 | Mitchell | A61H 1/008 601/96 |

OTHER PUBLICATIONS

German Examination Report for Application No. 10 2016 212 586.9, dated Apr. 13, 2017—4 pages.

* cited by examiner

PNEUMATIC DEVICE

CROSS REFERENCE TO RELATED APPLICATIONS

This application is the U.S. National Phase Application of PCT International Application No. PCT/EP2017/067339, filed Jul. 11, 2017, which claims priority to German Patent Application No. 10 2016 212 586.9, filed Jul. 11, 2016, the contents of such applications being incorporated by reference herein.

FIELD OF THE INVENTION

The present invention relates to a pneumatic device for the variation of a contour of a seat bearing surface of a vehicle seat. The present invention also relates to a vehicle seat having a device of said type. Finally, a method for producing a pneumatic device for varying the contour of a seat bearing surface of a vehicle seat is presented.

BACKGROUND OF THE INVENTION

In modern vehicle seats, bladders which can be filled with a pressure medium, in particular with a gaseous pressure medium such as compressed air, are situated as actuating elements in the region of the seat surface or backrest (together also referred to as the seat bearing surface), and can be supplied with pressure medium via a respective pressure medium line. By virtue of a respective bladder being filled with pressure medium, the volume thereof is increased, such that the characteristics of a backrest or of a seat surface can be varied in terms of contour in this way. For filling the respective bladder with the pressure medium, the pressure medium is firstly generated by a pressure medium source, for example by a compressor or a compressor unit, and guided via a corresponding control valve, in particular an electropneumatic valve of a control unit, to a respective bladder.

It is conceivable here for an arrangement described immediately above, composed of one or more bladders with respective associated pressure medium lines, to be produced by virtue of the respective pressure medium lines composed of separate rubber hoses firstly being connected to a respective bladder, for example by means of a welding process, and then the respective bladders together with the hose lines being fastened, in several steps, to a carrier foil. In the case of such a construction, a large number of individual parts are thus required, which must be joined together in a cumbersome manner in complex manufacturing steps.

SUMMARY OF THE INVENTION

An aspect of the present invention is a pneumatic device for the variation of a contour of a seat bearing surface of a vehicle seat, which pneumatic device can be produced with minimized outlay in terms of method and apparatus.

According to a first aspect of the invention, a pneumatic device for the variation of a contour of a seat bearing surface of a vehicle seat is created. Said pneumatic device has a carrier foil composed of a first and a second foil ply which are arranged adjacent to one another. Here, the two foil plies are produced in particular as flexible foil plies composed of a plastic. Furthermore, the pneumatic device has a first bladder for varying the contour of the seat bearing surface, comprising a bladder chamber which can be filled with a pressure medium. Here, by filling and evacuating the bladder chamber, the volume of the bladder chamber can vary, such that, by means of this volume variation, a pressure and thus a variation can be imparted to the contour of the seat bearing surface. Finally, the pneumatic device has a first pressure medium line which is connected to the first bladder and which is formed or created between the first and the second foil ply by connection of the first and second foil plies along a first line-side connection seam in order to create a pressure medium connection to the first bladder chamber of the first bladder. Through this provision of the pressure medium line in the carrier foil itself, there is thus no longer a need for a separate pressure medium line, such that the production of the pressure medium line can be performed in a simple manner with minimized outlay in terms of method and apparatus.

In one refinement of the pneumatic device, the first bladder is formed by connection of the first and second foil plies along a first bladder-side connection seam adjacent to the first line-side connection seam (and thus adjacent to the first pressure medium line) in order to create the pressure medium connection between the first pressure medium line and the first bladder. This means that, here, both the first pressure medium line and the first bladder are formed in or by the first and second foil plies of the carrier foil. In this way, the outlay in terms of device is further reduced, and it is moreover possible to realize a very thin structure of the pneumatic device (small extent perpendicular to the plane of the carrier foil), because components with a relatively large extent, such as for example air hoses as pressure medium lines, are omitted.

In a further refinement, it is conceivable for the pneumatic device to have at least one second pressure medium line which (correspondingly to the construction of the first pressure medium line) is formed by connection of the first and second foil plies along a respective second line-side connection seam. In this way, the outlay in terms of method and apparatus is further reduced, because further elements, such as an at least one second pressure medium line, are likewise incorporated in the carrier foil. In this way, it is furthermore conceivable to realize a simple and automatic production process, in which the pneumatic device or individual components thereof can be produced by means of corresponding connection steps with regard to the first and second foil plies of the carriers.

Furthermore, in one refinement of the pneumatic device, there may also be provided an at least second bladder with a respective bladder chamber which is formed by connection of the first and second foil plies along an at least second bladder-side connection seam adjacent to a respective second line-side connection seam in order to create a pressure medium connection between the at least one second pressure medium line and an at least one second bladder assigned to said at least one second pressure medium line. In this way, a further integration also of further bladders into the carrier foil is realized, such that the outlay in terms of method and apparatus in the production process is further minimized. Furthermore, in this way, a thin design is realized even in the case of a complex pneumatic device with a multiplicity of bladders and pressure medium lines which supply pressure medium to said bladders.

In a further refinement, it is conceivable for one bladder (the first bladder and/or the at least one second bladder) to not only be assigned one (the first or the at least second pressure medium line), but to rather also be assigned in each case one further pressure medium line which is formed in each case by connection of the first and second foil plies along a respective further line-side connection seam. Here, the respective further line-side connection seam and a corresponding bladder-side connection seam are formed adjacent to one another in order to likewise, via the respective further pressure medium line, create a pressure medium connection to a corresponding bladder. The respective further pressure medium line may be used for example as an additional filling line for a bladder assigned to said respective further pressure medium line, or else as a pressure medium line for the evacuation of the bladder. By integration of the respective further pressure medium line likewise into the carrier foil, it is furthermore possible to achieve a thin construction of the pneumatic device, which can be produced by means of a highly automatable process.

In a further refinement of the pneumatic device, the diameter of a pressure medium line (of the first, of the at least one second and/or of the respective further pressure medium line) perpendicular to the plane of the carrier foil and/or in the plane of the carrier foil is smaller than a diameter, perpendicular to the plane of the carrier foil or in the plane of the carrier foil, of a bladder chamber connected to the respective pressure medium line. In particular, in the case of a bladder filled with pressure medium, the (maximum) expansion of the bladder chamber perpendicular to the plane of the carrier foil should be greater than the expansion of the pressure medium line filled with pressure medium.

Correspondingly, the length of a pressure medium line may be greater or very much greater than the diameter of a pressure medium line (perpendicular to the line direction). It is also sought in this way to define the difference between a pressure medium line and the correspondingly associated bladder, specifically that a pressure medium line, when conducting pressure medium, exhibits a small expansion so as not to influence the comfort of a vehicle occupant sitting on the vehicle seat, whereas a bladder in the state filled with pressure medium undergoes an expansion greater than that of the pressure medium line, which then actually noticeably influences the contour of the seat bearing surface for the vehicle occupant.

According to an aspect of the invention, in the second foil ply or in one of the two foil plies of the carrier foil, an opening is provided in the region of a bladder (of the first and/or of the at least one second bladder) in order to form a pressure medium channel to a further bladder, which can be filled with pressure medium and which is connected to the second foil ply (in pressure-medium-tight fashion at a side opposite the first foil ply).

Said further bladder which can be filled with pressure medium may then be formed as a bladder with a single or multiple chamber. It is thus conceivable that the first or the at least one second bladder can be formed as a single-chamber bladder or also, through the addition of the further bladder which can be filled with pressure medium, as a multi-chamber bladder. By means of a corresponding multi-chamber bladder, it is then possible, in the region of said bladder, to realize more pronounced influencing of the contour of the vehicle seat, or influencing with a greater force.

In one refinement, it is conceivable for the respective line-side or bladder-side connection seams to be formed as weld seams. In particular, they may be formed as weld seams in a high-frequency welding process. It is however also conceivable to realize adhesive seams.

In a further refinement, the carrier foil has the dimensions of the seat bearing surface. In this context, it is conceivable for the carrier foil to have the dimensions of the seat surface or of the backrest, or of both.

According to a further aspect of the invention, a vehicle seat having the following features is created. Said vehicle seat has a seat bearing surface for a user or vehicle occupant. Said vehicle seat furthermore has a pneumatic device as per the above discussion or a refinement thereof, which pneumatic device is arranged in the vehicle seat (on the seat bearing surface) so as to vary the contour of the seat bearing surface. In this way, a vehicle seat having a pneumatic device which is easy to produce is created, which pneumatic device, owing to a thin design thereof, yields a high level of seat comfort.

In one refinement of the vehicle seat, the pneumatic device is arranged in the vehicle seat such that, in the region of the seat bearing surface (seat surface and/or seat surface), as lines for conducting pressure medium, only the pressure medium lines of the pneumatic device are provided. In this way, the seat comfort for a user or vehicle occupant is further increased, because no expanded and rigid components such as air hoses as pressure medium lines are used in the region in which the user makes contact with the seat bearing surface.

In a further refinement of the vehicle seat, said vehicle seat has a control unit which is connected to the pressure medium lines (first pressure medium line, at least one second pressure medium line and/or further pressure medium lines) of the pneumatic device in order to control a filling of the first and/or at least one second bladder with pressure medium or an evacuation thereof.

According to a further aspect of the invention, a method for producing a pneumatic device for varying the contour of a seat bearing surface of a vehicle seat having the following steps is created. A carrier foil with at least one first and one second foil ply is provided. Furthermore, a first bladder for varying the contour of the seat bearing surface, comprising a bladder chamber which can be filled with pressure medium, is provided. Finally, the first and the second foil ply are connected along a first line-side connection seam in order to form a first pressure medium line in the carrier foil in order to produce a pressure medium connection to the first bladder.

In a further refinement of the method, the provision of the first bladder comprises connecting the first and the second foil ply along a first bladder-side connection seam adjacent to the first line-side connection seam (adjacent to the first pressure medium line) in order to create the pressure medium connection between the first pressure medium line and the first bladder. In this way, a method for producing a pneumatic device with minimized outlay in terms of method and apparatus is created, because here, both the bladder and the pressure medium line within the carrier foil can be produced through the provision of corresponding connection seams.

Advantageous refinements of the pneumatic devices, where applicable to the vehicle seat and the method, are also to be regarded as advantageous refinements of the vehicle seat and of the method, and vice versa.

BRIEF DESCRIPTION OF THE DRAWINGS

Exemplary embodiments of the present invention will now be explained in more detail below with reference to the accompanying drawings. In the drawings.

DETAILED DESCRIPTION OF THE PREFERRED EMBODIMENTS

Figure 1:
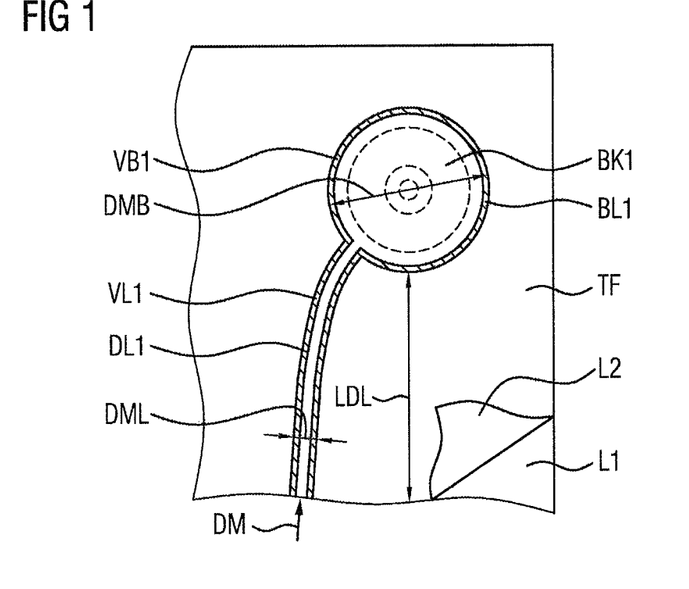
FIG. 1 shows a schematic plan view of a portion of a carrier foil into which a bladder which can be filled with pressure medium, and a pressure medium line connected to said bladder, are integrated in order to form a pneumatic device.

Reference is made firstly to FIG. 1, which shows a schematic plan view of a carrier foil TF. In conjunction with FIG. 2, which shows a corresponding schematic sectional illustration of the carrier foil TF from FIG. 1, it is now sought to discuss the construction of the carrier foil, with the structural elements implemented therein, for realizing a pneumatic device in particular for varying a contour of a seat bearing surface of a vehicle seat. Here, the carrier foil TF is composed of a first foil ply L1 and of a second foil ply L2 (and possibly further foil plies), which are arranged adjacent to one another. As an actuating element for influencing or varying the contour of a seat bearing surface of a vehicle seat, the carrier foil TF has a first bladder BL1. Said first bladder BL1 comprises in this case a bladder chamber BK1 which can be filled with pressure medium DM. Here, the first bladder is formed by connection of the first and second foil plies L1, L2 along a first bladder-side connection seam VB1. Said connection seam VB1 may be formed in particular as a weld seam, for example by means of a high-frequency welding process.

Furthermore, a first pressure medium line DL1 is provided in the carrier foil TF, which first pressure medium line is connected to the first bladder and is likewise formed by connection of the first and second foil plies L1, L2, in this case along a first line-side connection seam VL1, in order to create a pressure medium connection to the bladder chamber BK1. For this purpose, the first bladder-side connection seam VB1 is arranged adjacent to the first line-side connection seam VL1, such that the first pressure medium line DL1 transitions directly into the bladder chamber BK1. In order to more clearly indicate the region of the bladder BL1 in the cross-sectional view of FIG. 2, said region is enclosed between two dashed lines LB.

As can also be seen in FIG. 1, the diameter DML in the plane TFE of the carrier foil TF is smaller, or, as shown in FIG. 1, very much smaller, than the corresponding diameter DMB of the first bladder. It is furthermore also conceivable for the diameter of the first pressure medium line DL1, which conducts a pressure medium, perpendicular to the plane of the carrier foil to be smaller than a (maximum) diameter of the first bladder BL1, filled with pressure medium, perpendicular to the plane of the carrier foil. It is ensured in this way that a pressure medium line does not exhibit a large expansion, and scarcely influences the contour of the seat bearing surface, such that the seat comfort for a vehicle occupant or user is not influenced by a pressure medium line. By contrast, a noticeable change in contour should be made possible in the region of the bladder, for which reason greater or very much greater expansions, in particular perpendicular to the plane of the carrier foil TF, are desired in the event of a filling of a bladder.

As can also be seen in FIG. 1, the length LDL of the pressure medium line DL1 is greater or very much greater than the diameter DML of the pressure medium line DL1 (measured perpendicular to the line direction).

Figure 2:
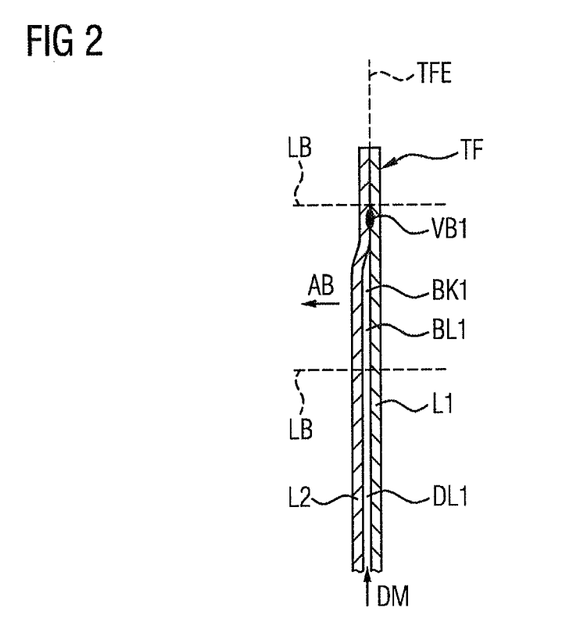
FIG. 2 shows a cross-sectional view of the portion of the carrier foil of FIG. 1 with the integrated bladder and pressure medium line.

If the first bladder BL1 is filled with pressure medium DM, then said pressure medium is, as shown in FIG. 2, introduced into the first pressure medium line DL1 from below in the figure, in order to flow upward into the first bladder chamber BK1. Owing to the inflowing pressure medium DM, the volume of the bladder chamber BK1 expands for example in the direction of the arrow AB, perpendicular to the plane TFE of the carrier foil TF. Thus, a pressure for varying the contour of the seat bearing surface of a vehicle seat is imparted in the direction of the arrow AB.

Here, the carrier foil TF may have foil plies L1 and L2 composed of plastic, which are of flexible or elastic form in particular in the region of the bladder BL1 in order to realize a reversible change in volume.

Figure 3:
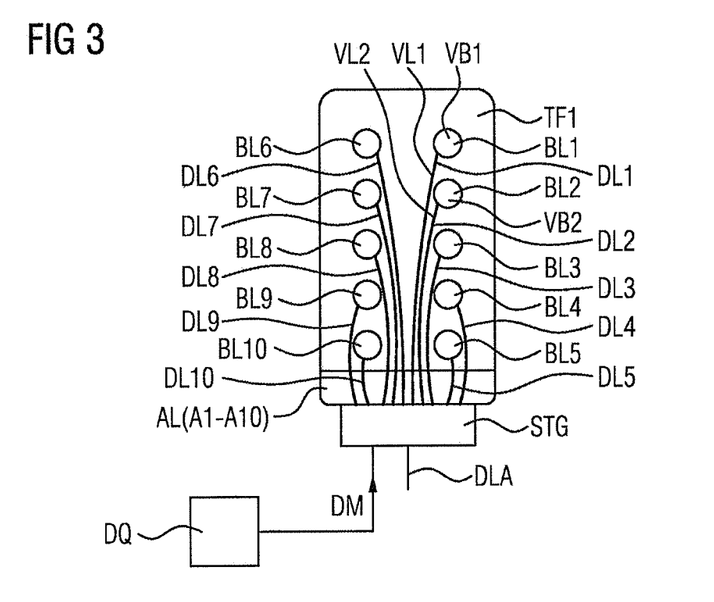
FIG. 3 shows a carrier foil with a multiplicity of bladders and pressure medium lines connected to said bladders, which pressure medium lines are connected to a control unit, in order to form a pneumatic device.

Reference is now made to FIG. 3, which illustrates a carrier foil TF1 for realizing a pneumatic device as per a further refinement. A characteristic of this carrier foil is that not only one bladder with corresponding pressure medium line but rather a multiplicity of bladders with associated pressure medium lines are provided, correspondingly to the construction of the first bladder BL1 and the first pressure medium lines DL1 in FIGS. 1 and 2. More specifically, the carrier foil TF1 has ten bladders BL1-BL10, which are assigned ten pressure medium lines DL1-DL10 for a pressure medium connection from a pressure medium source to the respective bladder. Merely for illustrative purposes, it is shown in FIG. 3 (correspondingly to FIG. 1) that the first pressure medium line DL1 is formed in the carrier foil TF1 by means of a first line-side connection seam VL1 for connecting a first and a second foil ply, in the same way as the first bladder BL1 is formed by the bladder-side connection seam VB1 which is adjacent to the first line-side connection seam VL1. Correspondingly, the second pressure medium line DL2 is also formed by means of a second line-side connection seam VB2 between the first and second plies of the carrier foil TF1, and the second bladder BL2 is formed by the second bladder-side connection seam VB2, which is adjacent to the second line-side connection seam VL2. The other bladders illustrated, with associated pressure medium lines, are of corresponding construction.

The carrier foil TF1 with the structural elements presented immediately above is then connected to a control unit STG, in which corresponding valves, in particular electropneumatic valves, are provided for filling the individual bladders with pressure medium or evacuating pressure medium therefrom. More specifically, the control unit STG has an adapter element AL which has ten ports A1 to A10, which are connected to the respective pressure medium lines DL1 to DL10. It is thus possible for a pressure medium DM provided by a pressure medium source DQ, such as a compressor, to be able to be conducted by means of the control unit STG and the adapter element AL selectively to a respective bladder, and for the compressed air to then be able to be discharged, for the purposes of evacuating a bladder, via a pressure medium outlet DLA on the control unit STG. In this way, the bladders BL1 to BL10 can be used as actuating elements for varying the contour of a seat bearing surface of a vehicle seat, and can be utilized here on the one hand for forming a corresponding support function (for example lumbar support) or for varying the contour of the respective bearing surface in the context of a massage program.

Figure 4:
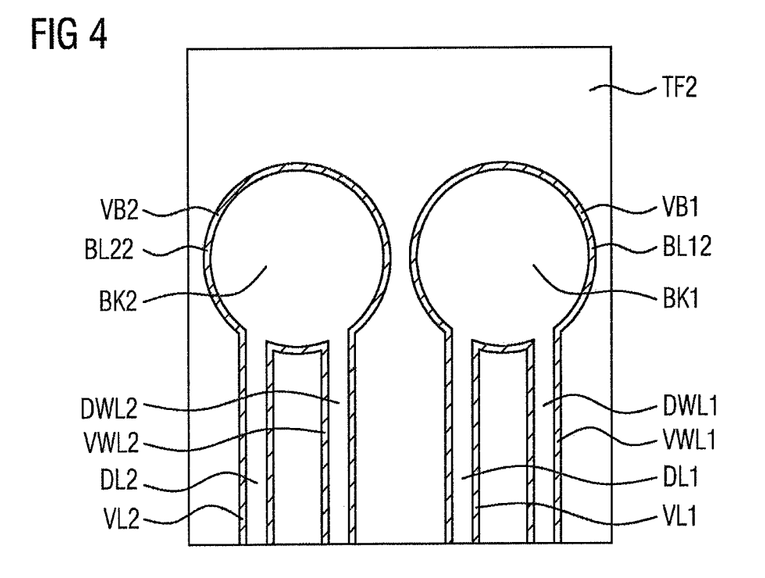
FIG. 4 shows a carrier foil with integrated bladders, which are assigned in each case two pressure medium lines.

Reference is now made to FIG. 4, which shows a carrier foil TF2 according to a further refinement. Here, it is again the intention for the carrier foil TF2 to have two foil plies, in which two bladders BL12 and BL22 with respective bladder chambers BL1 and BK2 are integrated. Here, the first bladder BL12 is again defined by connection of the two foil plies of the carrier foil at a first bladder-side connection seam VB1, whereas the second bladder BL22 is formed by means of a connection of the two foil plies along a connection seam VB2. A characteristic of this carrier foil TF2 as per FIG. 4 is that each of the bladders has not only one but two pressure medium lines, which are connected to the respective bladder chamber BK1 and BK2. Thus, the first bladder BL12 is assigned a first pressure medium line DL1, which is formed by means of connection of two foil plies of the carrier foil TF2 along a first line-side connection seam VL1, whereas, moreover, a first further pressure medium line DWL1 is assigned to the first bladder BL12, which first further pressure medium line is formed by means of connection of two foil plies of the carrier foil TF2 along a further first line-side connection seam VWL1. Correspondingly, the second bladder BL22 is assigned a first pressure medium line DL2, which is formed by means of connection of two foil plies of the carrier foil TF2 along a second line-side connection seam VL2, whereas, moreover, a second pressure medium line DWL2 is provided, which is formed by means of connection of two foil plies of the carrier foil TF2 along a second further line-side connection seam VWL2. By means of such a construction, it is possible for a first line assigned to the bladders to be used for example as a pressure medium inlet line, whereas the other of the respective lines can be used as a pressure medium outlet line. It is also conceivable, for rapid filling of a respective bladder or bladder chamber, to use both pressure medium lines of a respective bladder as pressure medium inlet. With regard to the principle of this embodiment of the carrier foil TF2, it is conceivable for such a carrier foil to comprise not only two bladders but also one, three or more bladders. It is furthermore conceivable for a respective bladder to have not only two but also more pressure medium lines (produced by means of a connection of two foil plies of the carrier foil).

Figure 5:
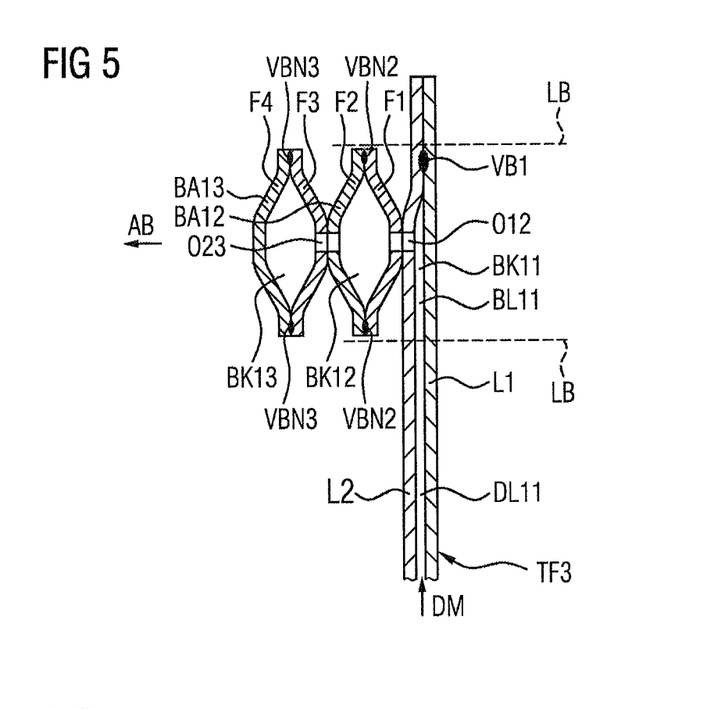
FIG. 5 shows a carrier foil in which a bladder with a pressure medium line is integrated, wherein the bladder comprises a multi-chamber arrangement.

Reference is now made to FIG. 5, which shows a schematic cross-sectional illustration of a carrier foil TF3 for realizing a pneumatic device as per an embodiment of the invention. Here, on the right-hand side of FIG. 5, the cross-sectional illustration corresponds substantially to the cross-sectional illustration of the carrier foil TF illustrated in FIG. 2. It can be seen here that the carrier foil TF3 has two foil plies L1 and L2, which, at various points or lines, have a connection seam in order to thereby form bladder chambers and associated pressure medium lines.

Whereas, within the dashed lines LB, the bladder BL11 is shown, which is defined by a first bladder-side connection seam VB1 in the carrier foil TF3 and which has a bladder chamber BK11 which can be filled with pressure medium, the associated first pressure medium line DL11 is defined by corresponding connection of the plies L1 and L2 at defined points or lines along a connection seam (not illustrated).

The characteristic feature of FIG. 5 now consists in that, in the region of the first bladder BL11, the second foil ply L2 has an opening O12 by means of which a pressure medium channel to a further bladder BA12 with a corresponding bladder chamber BK12 can be produced. The bladder BA12 also has an opening O23, which creates a channel to a third bladder BA13 with a third bladder chamber BK13. In this way, it is possible for pressure medium DM, which flows through the pressure medium line DL11 into the first bladder chamber BK11 upward from below in the figure, to flow via the opening O12 also into the second bladder chamber BK12 and via the further opening O23 also into the third bladder chamber BK13. It is thus possible, by filling all of the chambers BK11, BK12 and BK13, for a large stroke to be generated at a location in the region of the bladder BL11, which can then effect a large variation in the contour of the seat bearing surface. An expansion of the bladder arrangement BL11, BA12, BA13 shown during filling with pressure medium DM then takes place to the left in the figure, in the direction of the arrow AB.

As can furthermore be seen in FIG. 5, the bladders BA12 and BA13 can be produced by connection of in each case two foil plies. Accordingly, the bladder BA12 can be formed by foil plies F1 and F2, which are connected to one another at a connection seam VBN2. Furthermore, the bladder BA13 can be formed by foil plies F3 and F4, which are connected to one another at a connection seam VBN3. In this way, at the location of the bladder BL11 on the carrier foil TF3, a multi-chamber bladder arrangement is created by means of which a particularly large stroke, and thus a particularly great influence on the contour of a vehicle seat, can be realized.

It is conceivable here for the two foil plies L1, L2 to be formed from the same material as the foil plies of the bladders F1, F2, F3 and F4, for example from a TPU (thermoplastic polyurethane). It is however also possible to use a different material for the two foil plies L1, L2 than for the foil plies of the bladders F1, F2, F3 and F4. Accordingly, it is for example possible for a PVC plastic to be used for the foil plies L1, L2 of the carrier foil, and for a more durable TPU plastic to be used for the foil plies of the bladders F1, F2, F3 and F4, which can then be welded to the PVC of the carrier foil. In this way, a pneumatic device which satisfies requirements and which is inexpensive is created.

Figure 6:
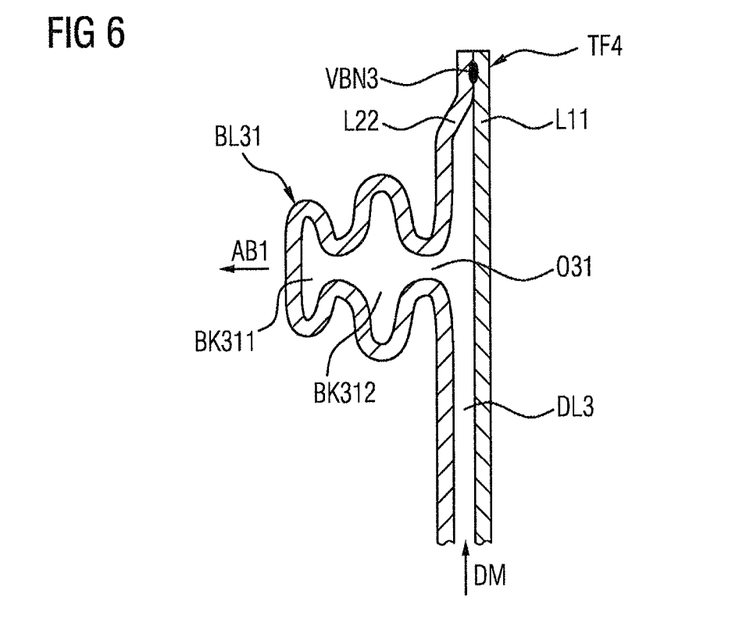
FIG. 6 shows a carrier foil in which an injection-molded foil ply already having a profile of a bladder has been integrated with a further foil ply in order to form a pressure medium line between the foil plies.

Reference is now made to FIG. 6, which shows a schematic cross-sectional illustration of a carrier foil TF4 for realizing a pneumatic device as per a further embodiment of the invention. It can be seen here that the carrier foil TF4 has two foil plies L11 and L22, which at various points or lines have a connection seam VBN3 in order to hereby form pressure medium lines, such as a pressure medium line DL3 between the foil plies L11 and L22 (in this regard, see also the explanations relating to FIGS. 2 and 5).

The characteristic feature of FIG. 6 now consists in that the second foil ply L22 has already been produced with a special structure or a special profile. More specifically, the foil ply L22 has been produced by injection molding of a plastics material, such as TPU, and has openings at certain locations, such as the opening O31, which forms a respective pressure medium channel to a bladder BL31. Here, the bladder BL31 comprises two chambers BK311 and BK312, and extends perpendicular to a plane E of the foil ply L22. By introducing pressure medium DM, the bladders BL31 and BL32 can be filled, and then expand in the direction of the arrow AB1. It is thus capable, by means of a stroke of said type, of exerting a force in the direction of the arrow AB1 in order to thereby influence a seat bearing surface of a vehicle seat.

Thus, by means of the method for producing the pneumatic arrangement as per FIG. 6, in which firstly a foil ply L22 is produced with corresponding bladder structures by means of an injection molding process, and then the structured foil ply L22 is connected to a further foil ply L11, in particular by welding, in order to form pressure medium lines, numerous individual welding process steps for the production of bladder chambers or individual bladders as in FIG. 5 can be omitted, such that the outlay in terms of process is minimized.

It is pointed out that, instead of two-chamber bladders as shown in FIG. 6, it is possible for single-chamber, three-chamber or multi-chamber bladders to be formed by means of the injection molding process. It is furthermore conceivable for one bladder (such as the bladder BL31), two bladders or more than two bladders to be supplied by one pressure medium line (such as the pressure medium line DL3).

Figure 7:
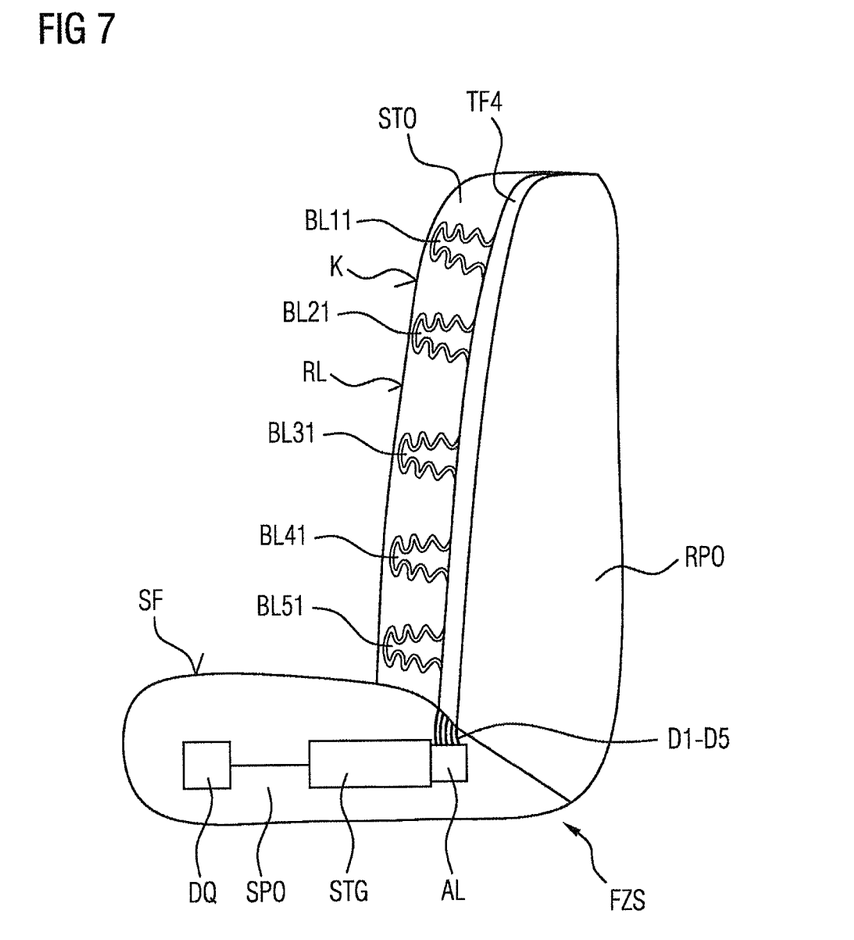
FIG. 7 is a schematic illustration of a vehicle seat in which a carrier foil with a multiplicity of multi-chamber bladders is arranged in the seat bearing surface in the region of the backrest.

Reference is finally made to FIG. 7 which shows a vehicle seat FZS. This vehicle seat comprises a seat cushion SPO and a backrest cushion RPO. Here, a seat surface SF on the seat cushion SPO and a backrest RL on the backrest cushion RPO each form a portion of a seat bearing surface of the vehicle seat FZS. A carrier foil TF4 has been applied to that part of the seat bearing surface which is formed by the backrest RL. The carrier foil TF4 corresponds substantially to the carrier foil TF3 shown in FIG. 5, with the difference that, instead of one multi-chamber bladder, five multi-chamber bladders BL11, BL21, BL31, BL41 and BL51 are now shown. It is however also conceivable to arrange a smaller or greater number of bladder arrangements on the carrier foil TF4. A lining STO, composed for example of cloth or leather, is then provided over the multi-chamber bladders, by means of which lining the contour K of the backrest is then formed, which can be influenced by the multi-chamber bladders.

It is moreover also conceivable, in addition to or instead of one or more three-chamber bladders, to provide single-chamber, two-chamber, four-chamber or multi-chamber bladders with five and even more chambers. The bladders BL11 to BL51 are in turn assigned corresponding pressure medium lines D1 to D5, which can then, similarly to the construction shown in FIG. 3, be connected to an adapter element AL of a control unit STG. Here, the control unit STG again serves for providing pressure medium, which is provided by means of a pressure medium source DQ, to the bladders BL11 to BL51 selectively via the pressure medium lines D1 to D5, in particular via electropneumatic valves, in particular for a massage function.

In a further refinement, each bladder (for example the first bladders BL11, BL12 and the second bladders BL2, BL22) may be assigned an individual pressure medium line, or each bladder may have a dedicated pressure medium line. In this way, each bladder can be individually controlled, which provides further possibilities for the variation of the contour of the seat bearing surface.

The invention claimed is:

1. A pneumatic device for varying a contour of a seat bearing surface of a vehicle seat, comprising:
   a carrier foil composed of a first foil ply and a second foil ply arranged adjacent to one another;
   a first bladder for varying the contour of the seat bearing surface, comprising a bladder chamber configured to be filled with a pressure medium;
   a first pressure medium line connected to the first bladder and formed by connection of the first and second foil plies along a first line-side connection seam in order to create a pressure medium connection to the bladder chamber of the first bladder, wherein one foil ply of the first and second foil plies has, in a region of the first bladder, an opening in order to form a pressure medium channel to a further bladder, the further bladder configured to be filled with the pressure medium and connected to one of the foil plies.

2. The pneumatic device as claimed in claim 1, in which the first bladder is formed by connection of the first and second foil plies along a first bladder-side connection seam adjacent to the first line-side connection seam in order to create the pressure medium connection between the first pressure medium line and the first bladder.

3. The pneumatic device as claimed in claim 2, which has at least one second pressure medium line formed by connection of the first and second foil plies along a respective second line-side connection seam.

4. The pneumatic device as claimed in claim 1, which has at least one second pressure medium line formed by connection of the first and second foil plies along a respective second line-side connection seam.

5. The pneumatic device as claimed in claim 4, which furthermore has at least one second bladder with a bladder chamber formed by connection of the first and second foil plies along an at least second bladder-side connection seam adjacent to a respective second line-side connection seam in order to create a pressure medium connection between the at least one second pressure medium line and an at least one second bladder assigned to said at least one second pressure medium line.

6. The pneumatic device as claimed in claim 4, in which at least one of the first bladder and the at least one second bladder is assigned in each case one further pressure medium line formed in each case by connection of the first and second foil plies along a respective further line-side connection seam.

7. The pneumatic device as claimed in claim 1, in which a diameter of a pressure medium line perpendicular to the plane of the carrier foil or in the plane of the carrier foil is smaller than a diameter of a bladder chamber connected to the respective pressure medium line.

8. The pneumatic device as claimed in claim 1, in which length of a pressure medium line is greater than the diameter of a pressure medium line.

9. The pneumatic device as claimed in claim 1, in which one foil ply of the first and second foil plies is produced, by an injection molding process, with a structure such that the structure has at least one bladder which extends perpendicular to a foil plane and is configured to be filled with pressure medium.

10. The pneumatic device as claimed in claim 9, in which the further bladder is formed with a single or multiple chamber.

11. The pneumatic device as claimed in claim 1, in which a respective connection seam is a weld seam.

12. The pneumatic device as claimed in claim 1, in which the carrier foil has dimensions of the seat bearing surface or of a seat surface or backrest that forms said seat bearing surface.

13. The pneumatic device as claimed in claim 1, wherein the first bladder and the second bladder respectively is assigned an individual pressure medium line.

14. A vehicle seat comprising:
   a seat bearing surface for a user;
   the pneumatic device as claimed in claim 1, arranged in the vehicle seat so as to vary the contour of the seat bearing surface.

15. The vehicle seat as claimed in claim 14, in which the pneumatic device is arranged in the vehicle seat such that, in region of the seat bearing surface, as lines for conducting pressure media, only the pressure medium lines of the pneumatic device are provided.

16. The vehicle seat as claimed in claim 15, which furthermore has a control unit connected to pressure medium lines of the pneumatic device in order to control a filling of at least one of the first and at least one second bladder with pressure medium or an evacuation thereof.

17. The vehicle seat as claimed in claim 14, which furthermore has a control unit connected to pressure medium lines of the pneumatic device in order to control a filling of at least one of the first and at least one second bladder with the pressure medium or an evacuation thereof.

18. A method for producing a pneumatic device for varying the contour of a seat bearing surface of a vehicle seat, comprising:

providing a carrier foil with at least one first foil ply and one second foil ply;

providing a first bladder for varying the contour of the seat bearing surface, comprising a bladder chamber configured to be filled with pressure medium; and connecting the first and the second foil ply along a first line-side connection seam in order to form a first pressure medium line in the carrier foil in order to produce a pressure medium connection to the first bladder.

19. The method as claimed in claim 18, in which the provision of the first bladder comprises connection of the first and of the second foil ply along a first bladder-side connection seam adjacent to the first line-side connection seam in order to create the pressure medium connection between the first pressure medium line and the first bladder.

\* \* \* \* \*